US007296817B1

(12) United States Patent
Mann et al.

(10) Patent No.: US 7,296,817 B1
(45) Date of Patent: Nov. 20, 2007

(54) FIFTH WHEEL SLIDE RAIL STOP BLOCK

(75) Inventors: Steven William Mann, Gardendale, AL (US); Michael Shane Wolfe, Helena, AL (US); Christopher Aaron Bond, Pinson, AL (US)

(73) Assignee: Fontaine International, Birmingham, AL (US)

( * ) Notice: Subject to any disclaimer, the term of this patent is extended or adjusted under 35 U.S.C. 154(b) by 0 days.

(21) Appl. No.: 10/941,135

(22) Filed: Sep. 15, 2004

(51) Int. Cl.
*B62D 53/06* (2006.01)

(52) U.S. Cl. .................... 280/438.1; 280/407; 280/433

(58) Field of Classification Search ................ 280/433, 280/438.1, 407, 407.1, 408, 440, 439, 441, 280/441.1; 248/220.1, 310
See application file for complete search history.

(56) References Cited

U.S. PATENT DOCUMENTS 2,985,463 A * 5/1961 Geerds ....................... 280/407
3,675,946 A * 7/1972 Korodi et al. .............. 280/440
3,861,709 A * 1/1975 Mulcahy et al. ............ 280/407
4,443,025 A * 4/1984 Martin et al. ............... 280/407
4,721,323 A 1/1988 Czuk
5,344,173 A * 9/1994 Beeler et al. ............ 280/438.1
5,449,191 A 9/1995 Cattau
5,707,070 A 1/1998 Lindenman et al.
6,488,305 B2 * 12/2002 Laarman .................. 280/438.1
6,592,140 B1 7/2003 Alguera Gallego et al.
6,682,089 B2 1/2004 McCoy et al.
6,736,420 B2 * 5/2004 Laarman et al. ......... 280/438.1

* cited by examiner

*Primary Examiner*—Carl D. Friedman
*Assistant Examiner*—Tan Le
(74) *Attorney, Agent, or Firm*—Lanier Ford Shaver & Payne P.C.; George P. Kobler

(57) ABSTRACT

A stop block for preventing over travel of an adjustable fifth wheel hitch assemblies comprising a generally rectangular solid member having a double curve disposed in said member such that a long portion of said member is higher in elevation than a short portion of said member.

2 Claims, 4 Drawing Sheets

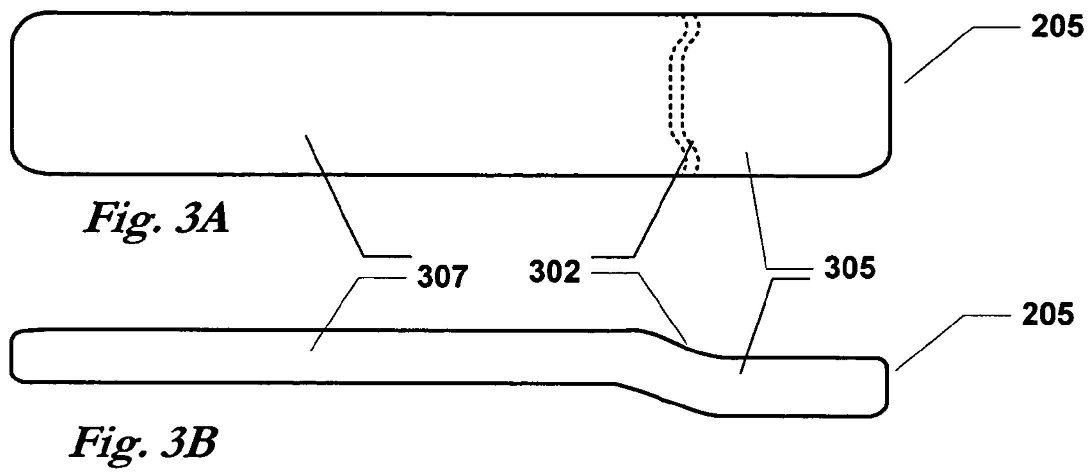
Fig. 3A
Fig. 3B
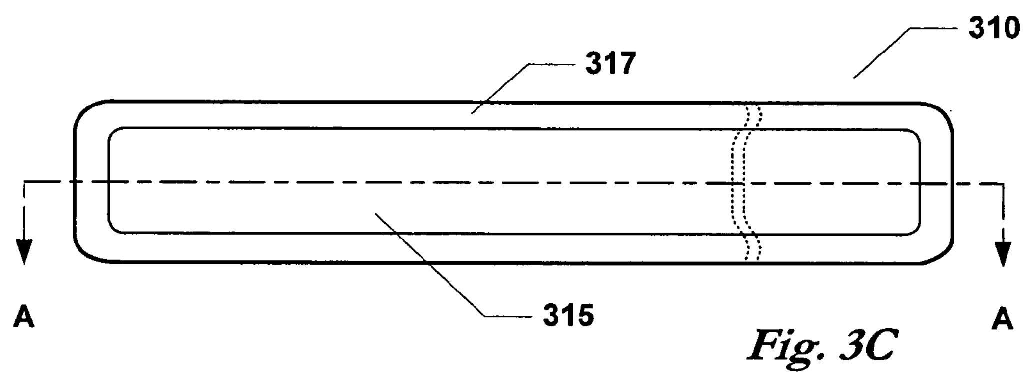
Fig. 3C
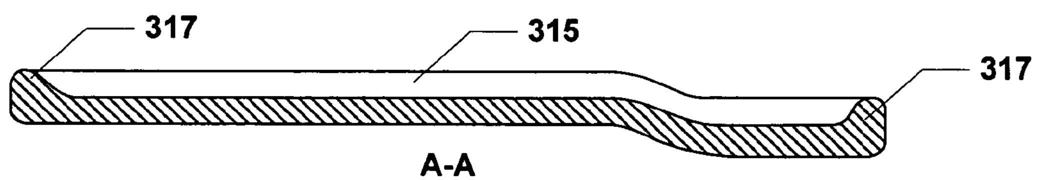
Fig. 3D

FIFTH WHEEL SLIDE RAIL STOP BLOCK

BACKGROUND

1. Field

The present invention relates generally to fifth wheel hitches for coupling trailers to tractor trucks, and, in particular, fifth wheel hitches having adjustable positions, and further, to slide rail assemblies for fifth wheel hitches having stop blocks.

2. Description of the Related Art

Fifth wheel hitches for towing a trailer behind a towing vehicle have long been known in the art. Examples of fifth wheel hitches include those disclosed in U.S. Pat. Nos. 4,721,323, 5,449,191, and 5,707,070.

Referring to FIGS. 1A through 1D, a fifth wheel hitch assembly 101 includes a support frame 150 for mounting hitch assembly 101 to towing vehicle 109, such as, for example, to a truck. Support frame includes a pair of base rails 102*a, b* that are bolted to the bed and/or frame of the truck 109. Hitch plate 130 is mounted to a pedestal 155 by means of a trunnion arrangement, or journal bearing, allowing for pivotal fore-and-aft movement of hitch plate 130. Hitch plate 130 includes a latch assembly (not shown) which further includes a jaw assembly specifically adapted to releasably engage and hold a kingpin 115 of a trailer 119 desired to be towed by the towing vehicle 120.

Some fifth wheel hitch assemblies 101 are adjustable axially with respect to the towing vehicle 109 frame. One way of achieving this feature is attach slide rails to the support frame of the hitch and configure the pedestal 155, upon which the hitch plate and latch assembly is mounted, to slidably engage the slide rails 151*a, b*. The conventional design of these slide rails is often a simple flange extending inward of the slide assembly which may be angled metal. Slide rails 151*a, b* are attached to the support frame by fillet welding and by bolts. Stop blocks are used to prevent over-travel of pedestal 155 in slide assembly and are affixed to the ends of slide rails 151*a, b.*

Prior art stop blocks 105*a-d* are generally rectangular members that are affixed to the end of a slide plate usually with lap welding. A short-coming of this technique is that with such a small block there is a relatively small point of failure. Under large trailer loads, there can be excessive longitudinal forces pulling the hitch aft which may result in disassembly of the stop block from the fifth wheel slide assembly. Further, the attachment helping to support the stop block is limited to the slide plate area. Thus, a stop block is needed which will better withstand such longitudinal forces through distribution of the load.

SUMMARY

The present disclosure is directed to a slide rail and a slide rail assembly that satisfies this need.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

A stop block for an adjustable fifth wheel hitch comprises a generally rectangular member having a double curve disposed in the member resulting in a long portion of the member and a short portion of the member and such that the long portion of the member is at a higher elevation than the short portion of said member.

This and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 3A is a detailed top view of an exemplary stop block according to the present invention;

FIG. 3B is a side view of the stop block shown in FIG. 3 A;

FIG. 3C is a top view of an exemplary stop block according to another embodiment of the present invention;

FIG. 3D is a cross-section view along line A-A of the exemplary stop block depicted in FIG. 3C.

DETAILED DESCRIPTION

The various embodiments of the present invention and their advantages are best understood by referring to FIGS. 1 through 3D of the drawings. The elements of the drawings are not necessarily to scale, emphasis instead being placed upon clearly illustrating the principles of the invention. Throughout the drawings, like numerals are used for like and corresponding parts of the various drawings.

Figure 1A:
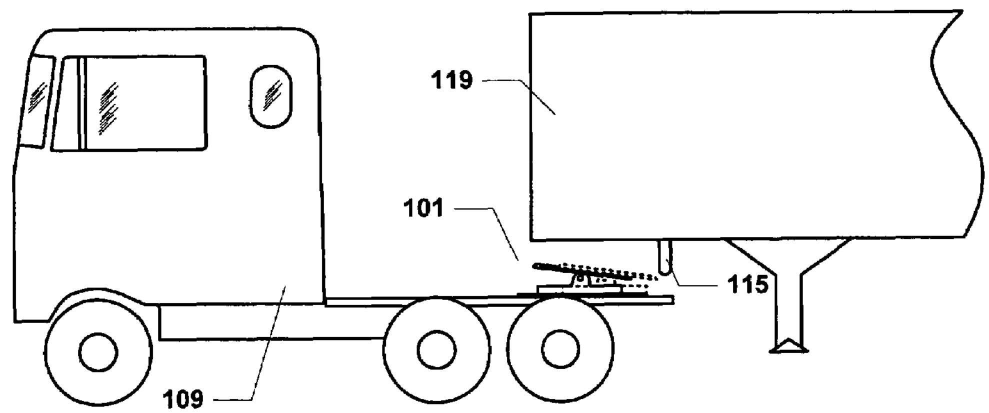
FIG. 1A is an exemplary towing vehicle and trailer to depict general operation of an adjustable fifth wheel hitch assembly.
Figure 1B:
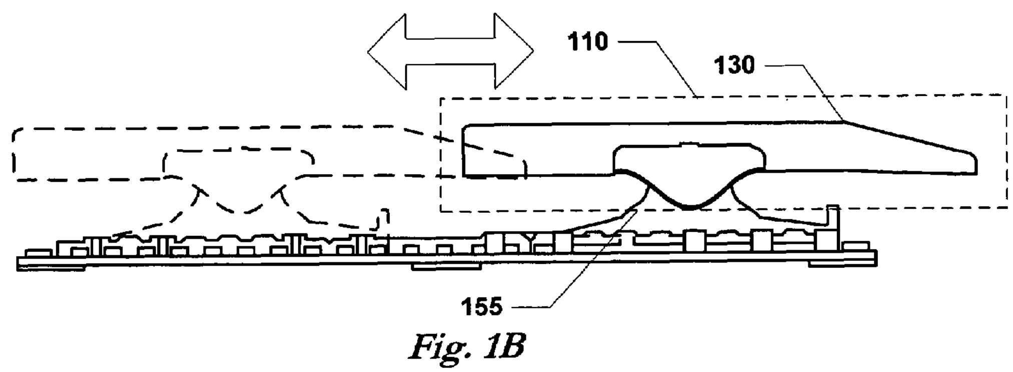
FIG. 1B is a side view of an exemplary fifth wheel hitch assembly showing fore and aft adjustment of such assembly.
Figure 1C:
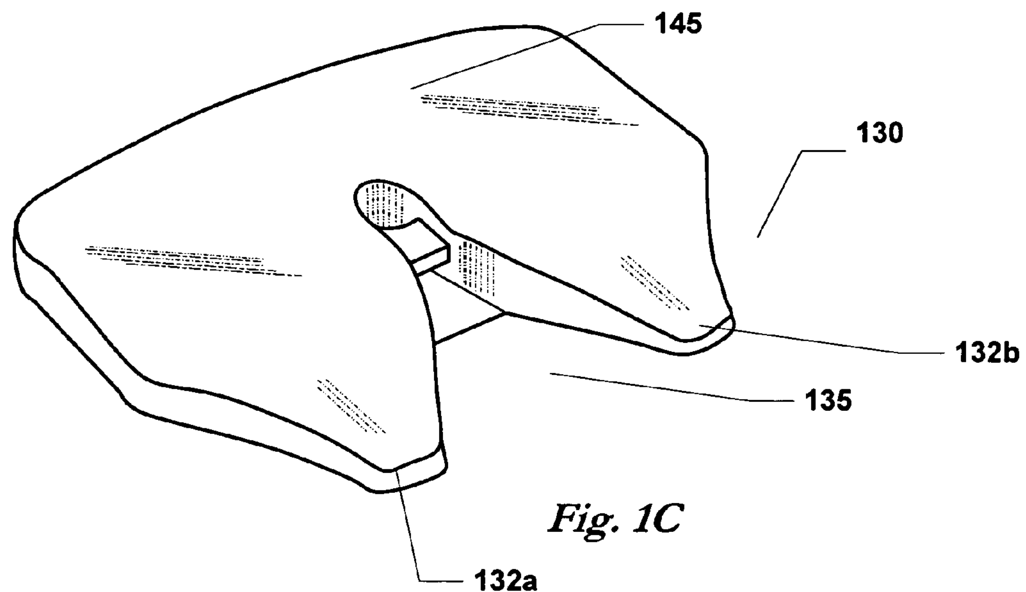
FIG. 1C illustrates an exemplary hitch plate.
Figure 1D:
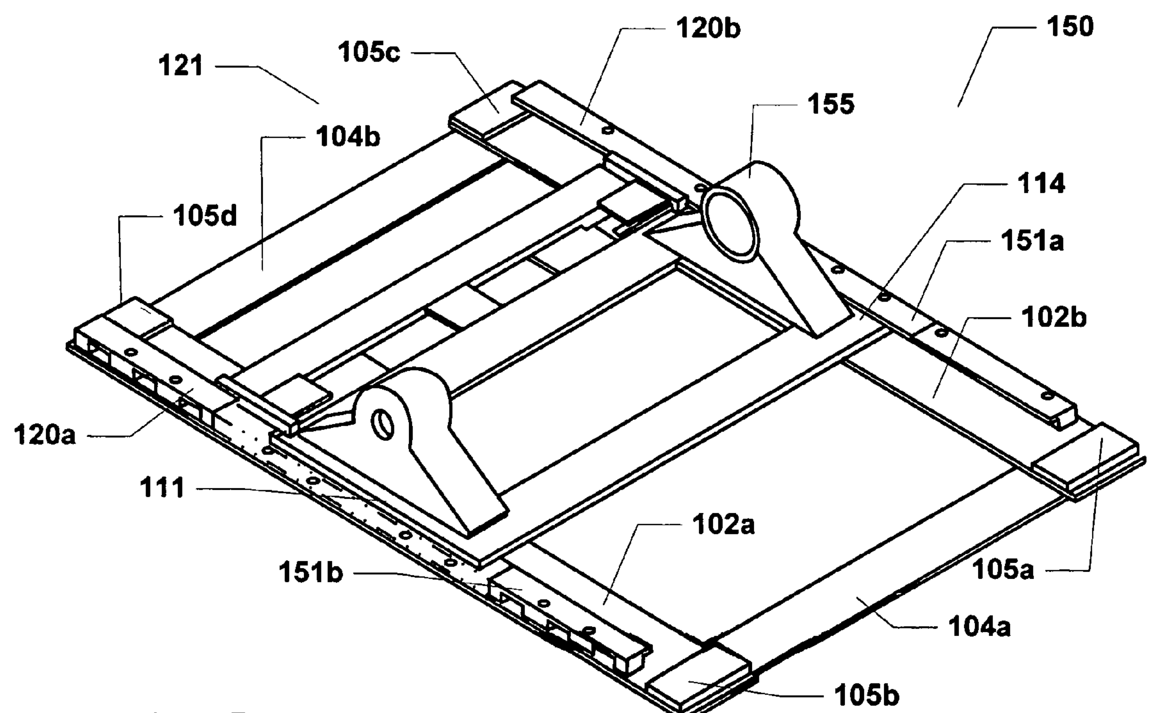
FIG. 1D (PRIOR ART) is an exemplary support for a fifth wheel hitch assembly depicting, inter alia, stop blocks according to the prior art.

Looking first to FIGS. 1A-1D, an adjustable fifth wheel assembly 101 includes a fifth wheel hitch assembly 110 pivotally mounted on moveable pedestal 155. Fifth wheel hitch assembly 110 comprises hitch plate 130 comprising two tines 132*a, b* defining slot 135 opening toward the aft end of fifth wheel assembly 101 for receiving a king pin 115 from trailer 119. Fifth wheel hitch includes locking mechanism (not shown) to secure king pin within slot 135 for towing. Moveable pedestal 155 is configured with left and right slide flanges 111, 114 and slidably engaged with left and right slide assembles 120*a, b* which is mounted to towing vehicle 109 frame. Slide assemblies 120*a, b* permit longitudinal positioning of fifth wheel hitch assembly 110 with respect to tractor frame, as shown in FIGS. 1A and 1B.

Exemplary slide rail assemblies 120*a, b* are comprised of left and right slide rail plates 102*a, b* tied in parallel by two or more tie bars 104*a, b* which form slide frame 121. Left slide rail 120*a* is attached to the upper surface of left slide rail plate 102*a* and right slide rail 120*b* is attached to upper surface of right slide rail plate 102*b* such that fifth wheel hitch assembly 110 and pedestal 155 are located therebetween, inboard of the left and right slide rails 120*a, b*. Slide rail plates 102*a, b* and slide rails 120*a, b* each have longitudinal axes which parallel the longitudinal axis of towing vehicle 109.

Figure 2:
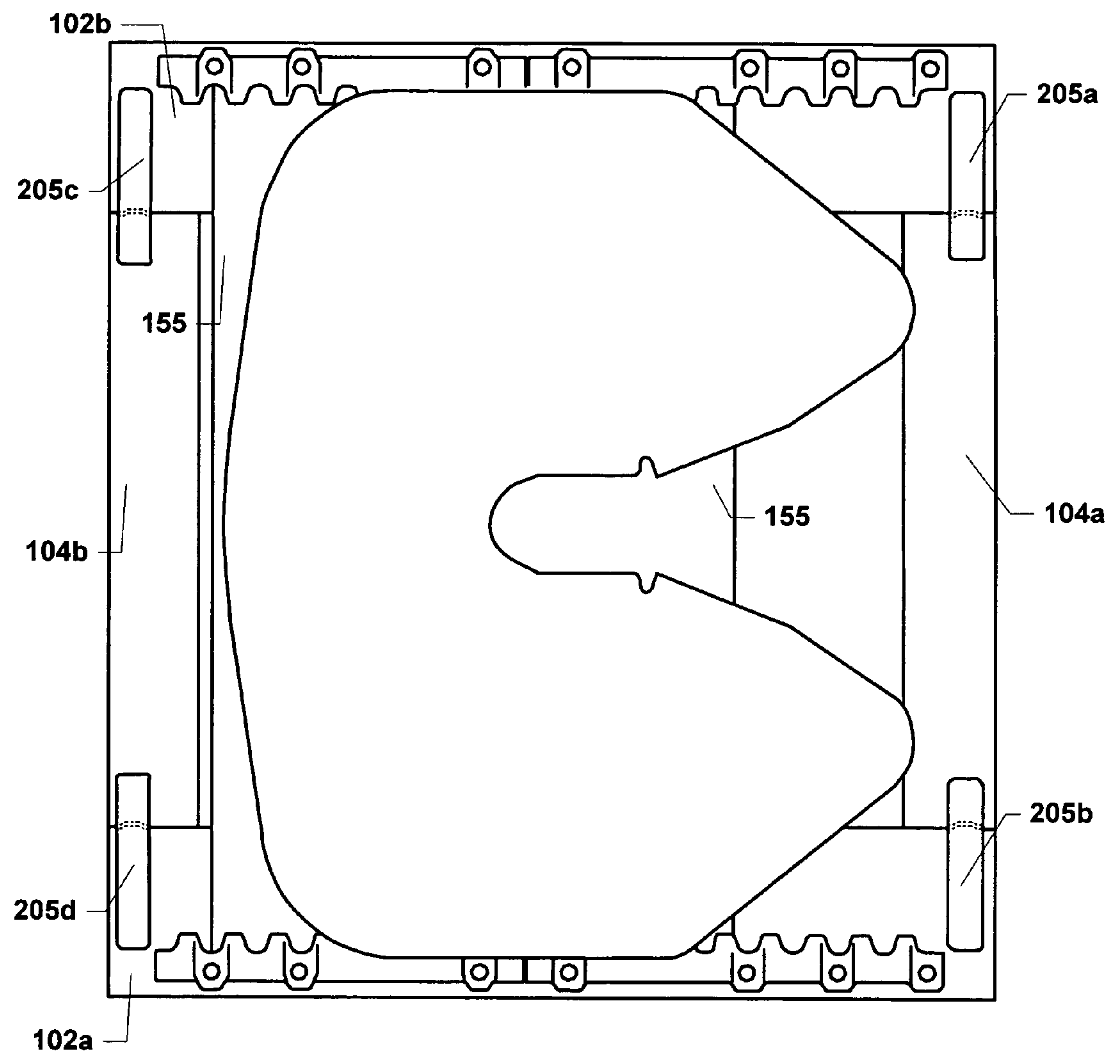
FIG. 2 is the top plan view of an exemplary fifth wheel assembly showing stop blocks according to the present invention.

Referring now to FIG. 2, the slide stops of the present invention will be described in detail. Slide stops 205*a-d* are located toward each end of each slide rail plate 102*a, b* and are affixed to both the tie bars and the ends of slide rail plates 102*a, b*. Slide stop blocks 205*a-d* prevent over-travel of pedestal 155. Slide stop blocks 205*a-d* are oriented with respect to slide rail assembly 120 parallel to tie bars 104*a-b*, each of the stop blocks having an outward oriented end affixed to the ends of slide rail plates 102*a,b* and an inward oriented end affixed to tie bar 104*a,b*. Stop block 205*a-d* is affixed to frame such that a majority of stop block 205*a-d* rests upon slide rail plate 102*a, b* and the remainder rests upon tie bars.

FIGS. 3A, B show an exemplary stop block 205 in greater detail where stop block 205 is a plate member comprising a double curve 302 located toward one end of stop block 205 resulting in a short segment 305 and a long segment 307. When stop block 205 is installed in slide rail assembly, bottom surface of long segment 307 rests upon the top surface of slide rail plate 102 and bottom surface of short segment 305 rests upon the top surface of tie bar 104, the double curve 302 allowing a step-down in elevation. Thus, double curve 302 permits substantially all, if not all, of the bottom surface of long segment 307 to be seated upon the top surface of tie bar 104. Likewise, double curve 302 allows substantially all, if not all, of the bottom surface of short segment 305 to be seated upon the top surface of slide rail plate 102. Long segment and short segment of stop block may be affixed to slide rail plate and tie bar, respectively, by various methods known in the relevant arts, or which may be later developed. One non-limiting example is lap welding, a technique well-known in the art.

FIGS. 3C, D depict an alternative stop block 310 where the top surface of stop block 310 departs from the top plane of stop block 310, as defined by the top edge thereof, forming hollow 315. Hollow 315 reduces the amount of material out of which stop block is comprised and therefore, results in a reduction of mass. Ridge 317 circumscribing hollow 415 provides lateral and longitudinal support.

As described above and shown in the associated drawings, the present invention comprises a stop block for a fifth wheel slide assembly. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

We claim:

1. A fifth wheel assembly comprising:

a. a frame composed of two parallel slide plates, each of said two slide plates having two ends;

b. two tie bars for holding said slide plates in parallel, said at least two tie bars having ends, said tie bar ends having top surfaces, said top surfaces affixed to under sides of said slide plates ends; and c. four stop blocks, each of said stop blocks consisting essentially of: a generally rectangular solid member having a generally rectangular double curved longitudinal cross-section dividing said member into a long portion and a short portion whereby said long portion of said member is higher in elevation than said short portion of said member, wherein each of said four stop blocks is affixed to said assembly proximal to each end of each said slide plate by affixing each said long portion to the end of each said slide plate and said short portion to the top surface of the associated tie bar affixed to said slide plate.

2. The fifth wheel assembly of claim 1, wherein each of said stop blocks comprises a ridge about the periphery of a top surface of said member, said ridge defining a hollow disposed upon said top surface.

* * * * *